March 18, 1958  H. C. WYNNE ET AL  2,826,868
MANUFACTURE OF FLAT GLASS IN CONTINUOUS RIBBON FORM
Filed June 4, 1953  2 Sheets-Sheet 1
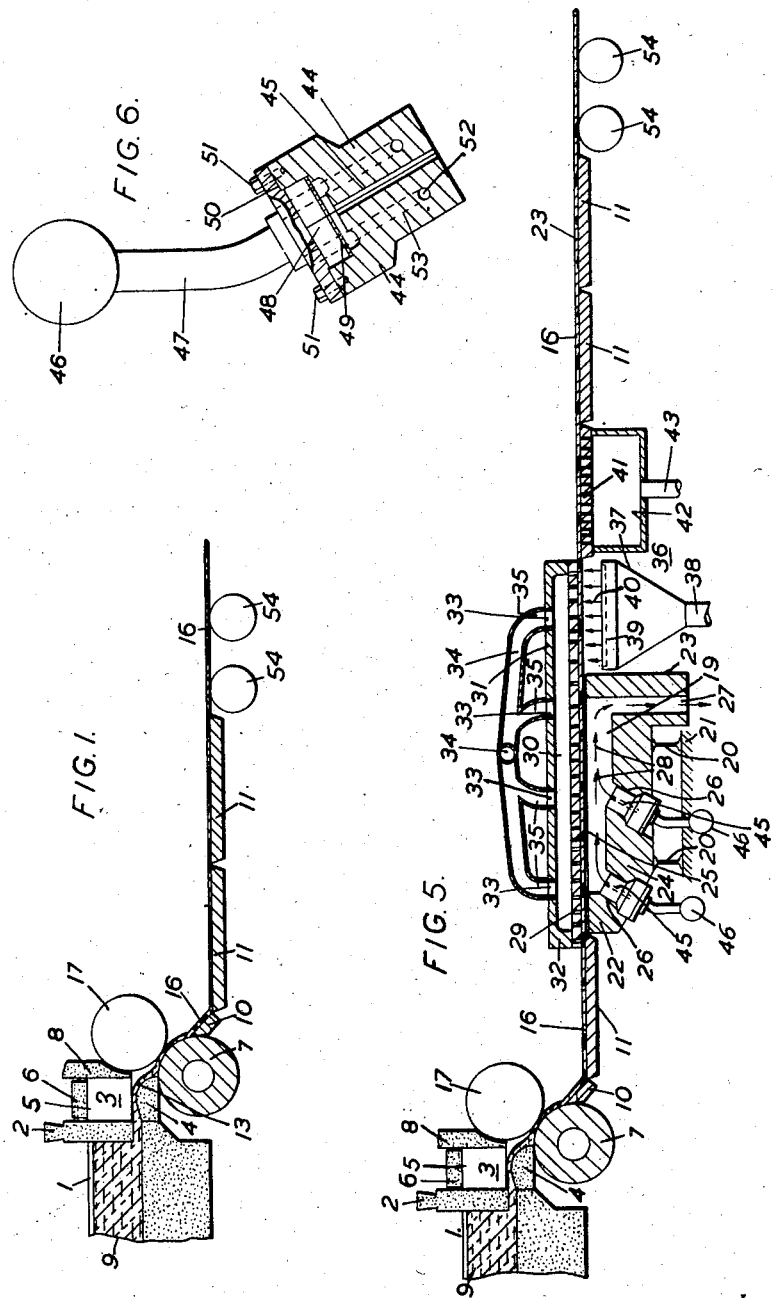
Inventors
H. C. Wynne
J. L. Antill
By Morrison Kennedy Campbell
Attorneys March 18, 1958  H. C. WYNNE ET AL  2,826,868
MANUFACTURE OF FLAT GLASS IN CONTINUOUS RIBBON FORM
Filed June 4, 1953  2 Sheets-Sheet 2
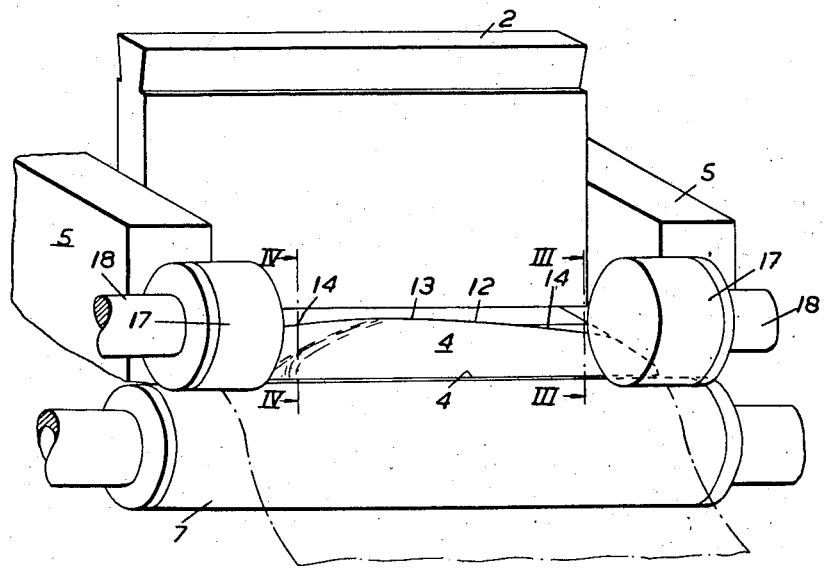
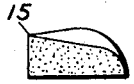
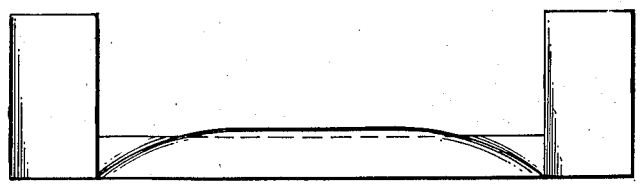
Inventors
H. C. Wynne
J. T. L. Tuttall
By
Morrison Kennedy Campbell
Attorneys 2,826,868
Patented Mar. 18, 1958

2,826,868

MANUFACTURE OF FLAT GLASS IN CONTINUOUS RIBBON FORM

Hubert Cecil Wynne and James Robert Lewis Nuttall, Barnby Dun, near Doncaster, England, assignors to Pilkington Brothers Limited, Liverpool, England, a corporation of Great Britain Application June 4, 1953, Serial No. 359,546

Claims priority, application Great Britain June 9, 1952

4 Claims. (Cl. 49—33)

This invention relates to the manufacture of flat glass in continuous ribbon form.

In the manufacture of flat glass in continuous ribbon form a usual practice is to flow the molten glass from a spout of a tank furnace, in which the glass batch is melted, to the pass between casting rolls which are driven at a slow peripheral speed which is substantially the same as the speed of the ribbon of glass which emerges from the rolls. These rolls are of greater length than the dimension of the width of the ribbon and as the ribbon passes between them squash it to the desired thickness. The rolls are mounted for mutual adjustment to regulate the distance between their peripheries, which distance determines the thickness of the ribbon emerging from the rolls. This operation is sometimes referred to as "sizing."

During the operation of sizing the ribbon, the glass passes in intimate contact with the metal of the two rolls and accordingly a heat exchange is effected between the surfaces of the ribbon and the rolls so that the surfaces set as a result of the loss of heat by transfer to the rolls.

A main object of the present invention is to eliminate the usual sizing operation in the manufacture of flat glass in continuous ribbon form and thereby minimise the heat losses suffered by the glass during that operation at the same time avoiding waviness in the ribbon such as results from slight uneveness in the generatrices of the casting rolls used in a sizing operation.

Another main object of the invention is to devise an apparatus for manufacturing a continuous ribbon of glass with a surface having a "fire finish." By "fire finish" is meant that brilliance which molten glass obtains when the surface thereof is allowed to set by loss of heat sustained by radiation and by heat exchange with a gaseous medium.

A method of operation of the apparatus for manufacturing flat glass in continuous ribbon form is characterized by flowing molten glass from a spout of a glass furnace on to a continuous casting surface moving in the same sense as the glass flow said spout having a width substantially equal to that of the glass ribbon to be formed according to the present invention involves the operation of restraining the mass flow of glass in the middle area of the spout to compensate for the slower speed of flow of the more viscous glass in the side areas of the spout whereby the ribbon of molten glass formed on the casting surface has a cross section of substantially constant thickness. The glass leaving the spout flows freely on to the casting surface and by natural flow achieves the desired ribbon form and as the exposed surface sets solely by loss of heat due to radiation and by heat exchange with a gaseous medium a fire finish is obtained on that surface.

One method of operation of the apparatus in accordance with the invention is characterised in that the glass in the middle area of the spout is caused to travel over a path inclined upwardly to an extent to reduce the speed of flow of the glass derived from the head on the body of glass being fed to the spout, whilst the glass in each side area of the spout traverses a downwardly inclined path to increase the speed of flow derived from the said head, the respective inclines being such as to regulate the volume of glass flowing in the respective areas to assure a cross section of substantially constant thickness for the ribbon of glass formed on the casting surface.

After leaving the casting surface the ribbon is preferably constrained to advance in substantially a horizontal path towards a lehr, as will be well understood in the art, and in a method of manufacture in accordance with the invention the undersurface of the ribbon may be progressively swept with a sheet of flame to impart heat to an extent at least to compensate for loss of heat in the undersurface by heat transfer to the casting surface, the ribbon being suspended in the said horizontal path, as it passes over the heating sheet of flame by suction applied over a sufficient area of the upper surface of the moving ribbon.

The effect of so heating the glass is to cause a remelting of the surface and in order that the surface treated shall acquire a fire finish and shall not be marred during its advance towards the lehr, the heated undersurface is chilled by air while still suspended by suction in the said horizontal path thereby the undersurface as well as the upper surface of the ribbon is cooled sufficiently to set by radiation and by heat exchange with the air.

The present invention comprises also apparatus for manufacturing flat glass in continuous ribbon form which is characterised by the combination with a spout of a glass melting tank furnace, having side jambs and means for maintaining the side jambs at a high temperature, and a casting roll, immediately below and in front of the spout, of means for regulating the volume of flow of glass across the width of the spout so that the glass ribbon formed on the casting roll has a cross section of substantially constant thickness and a pair of coaxial driven rollers operatively associated with the casting roll and disposed to engage and compress only the marginal portion of the ribbon of glass formed on the roll and draw forward the glass from the sides of the spout and advance the ribbon.

To regulate the volume flow of glass across the width of the spout in accordance with the invention the lip of the spout may be cambered symmetrically about the longitudinal centre line of the spout whereby a substantially constant mass flow occurs at the mouth across the width of the spout.

Apparatus constructed according to the present invention may comprise in combination with a plane support for the ribbon extending forwardly of the casting roll a heating chamber structure supported under the ribbon and opening to the plane of the support thereby forming with the ribbon a substantially closed heating chamber, when the ribbon passes thereover, means for forming a sheet of flame within the chamber and for directing the flame towards the ribbon to move in substantial parallelism therewith, so that the undersurface of the ribbon is swept by the flame, a suction plate member located in the plane of the upper surface of the moving ribbon and having air passage therethrough above the ribbon in the vicinity of the heating chamber and in an extension thereof disposed forwardly of the heating chamber, a cover to the plate member and extension, means for forming a vacuum within the cover, the total suction force applied to the glass being such that the ribbon can be advanced in contiguity with the plate member, and means for directing an air flow against the undersurface of the glass to chill the undersurface before it leaves the suction plate member, the support for the glass extending forwardly from the casting roll being interrupted over the heating chamber to accommodate the latter, whereby both surfaces of the ribbon may be thermally treated to acquire a fire finish during the forward movement of the ribbon.

The present invention is applicable to the production of "slow setting glass" in flat ribbon form. By "slow setting glass" is meant a glass having in its composition a low silica ($SiO_2$) content e. g. 70%, and a low lime (CaO) content e. g. 4%, but the invention is equally applicable to the production of quick setting glass in flat ribbon form e. g. those glasses known as "plate glass" and "window glass," whether only one or both surfaces of the ribbon are to be given a fire finish.

The plane support for the ribbon, particularly that part thereof following the means for chilling the under surface after heat treatment, may be formed by a porous plate or an apertured plate on the underside of which plate a chamber is formed whereby air under sufficient pressure is delivered from the chamber through the supporting plate to provide a cushion of air between the moving ribbon and the plate, thereby providing a frictionless gaseous film between the ribbon and the support. However, no claim is herein made to the novelty per se of a supporting plate with associated means for producing an air cushion thereover.

In order that the invention may be more clearly understood, reference will now be made to the accompanying diagrammatic drawings which illustrate, by way of example, two preferred embodiments thereof.

In the drawings:

Figure 1 shows in central sectional elevation the discharge end of a canal of usual form leading from a glass melting tank furnace connected to a spout and a casting roll associated with marginal driven rollers in accordance with the invention.

Fig. 1a is a front elevational view of the lip of the spout looking in a direction opposite to the direction of movement of the ribbon.

Figure 2 is a pictorial view of the apparatus shown in Figure 1 taken from the front thereof the cover and gate being omitted for the sake of clarity.

Figures 3 and 4 are detail sectional elevations showing the forms of the lip of the spout taken on the lines III—III and IV—IV respectively of Figure 2, and Figure 5 is a diagrammatic sectional elevation of a modified form of apparatus embodying the structure shown in Figure 1 and apparatus for forming a fire finish on the undersurface of the ribbon; and Figure 6 is a detail of a burner employed in the apparatus shown in Figure 5.

In the drawings, like references indicate the same parts.

Referring first to Figures 1–4 of the drawings: A canal of a continuous glass melting tank is indicated at 1, the regulating tweel at 2 and the spout at 3, the spout comprising a floor or "lip" 4 and side jambs 5, the side jambs and lip forming a spout of a generally rectangular cross section and of a width substantially equal to that of the ribbon, on which spout a cover 6 is secured in known manner. Heaters may be incorporated in the side jambs in the usual manner to maintain the jambs at a high temperature to minimise the temperature gradient across the spout.

A water cooled casting roll 7 is disposed under the lip and a gate 8 is adjustably suspended (by means not shown) in a vertical plane. The casting roll 7 is located so that molten glass 9 flows on to an upper part of the roll comprising a downwardly and forwardly directed arcuate casting bed moving in the same sense as the general direction of flow from the spout, so that the molten glass 9 on leaving the spout and arriving on the contiguous casting bed is constrained to flow forwardly, thereby preventing backward flow of the glass leaving the spout lip 4.

Forwardly of the casting roll 7 is arranged a support for the ribbon of glass leaving the roll 7. The support comprises a sloping member 10 and a series of horizontal members 11. The member 10 directs the ribbon leaving the casting roll 7 into a predetermined horizontal path prescribed for the ribbon by the disposition of the plane supports 11.

As will be clearly understood by considering Figures 1–4 the spout lip 4 has a smoothly curved convex surface 12 extending from side to side which surface is symmetrical in form about the central line of the lip.

At the middle area 13, the surface is inclined upwardly from the canal and in the side areas 14 the surface is inclined downwardly from the canal. Hypothetically it can be said, that if the back line 15 of the lip (see Figures 3 and 4) is considered as a hinge for the surface generatrices that the generatrices are tilted upwardly progressively from the sides of the spout to the highest level, which is the middle area, where they are raised slightly above the horizontal plane containing the hinge, so that in nature a hump is formed in the middle area of the lip. By such arrangement of the generatrices of the surface of the lip, a restraint is placed on the mass flow in the central area, and the normal speed of flow in the spout derived from the head of glass in the canal 1 (supposing the surface of the lip was level) is reduced, whilst the speed of the glass on each side area of the spout is increased, thus the flow across the width of the spout is regulated so that the glass leaving the spout has a cross section of substantially constant thickness which is predetermined by adjustment of the tweel 2 thereby the glass arriving on the roll 7 naturally spreads symmetrically to form a ribbon of the desired thickness.

To draw the molten glass from the sides of the spout and to advance the ribbon 16 as it is formed on the roll 7, a pair of coaxial driving rollers 17 are provided which are disposed so as to engage only the marginal portion of the ribbon, and they are operatively associated with the roll 7 so as to compress the marginal portions of the ribbon, and drive the ribbon forwards, the rollers 17 are driven by means (not shown) which actuate the shafts 18 on which the rollers are fixed, the peripheral speed of the rollers being substantially the same as the linear speed of the ribbon. The rollers 17 are shielded from the heat radiated from the molten glass 9 by the gate 8.

As a result of forming a ribbon by using the apparatus described the upper surface of the body of the ribbon is cooled by radiation and by heat exchange with the ambient air and in consequence a fire finish can be obtained on the upper surface between the marginal portions.

The roll 7 has a highly polished surface where the undersurface of the ribbon is required to be smooth, but the surface of the roll may have an intaglio configuration to impart a pattern in relief on the underface of the ribbon.

Accordingly an apparatus constructed as already described may be used for the production of continuous ribbon of either a clear glass (plate glass or window glass) or an opaque glass of the slow setting type for example that glass marketed under the registered trademark Vitrolite, and in either case the upper surface of the naturally formed ribbon acquires a fire finish.

Where it is desired to manufacture a continuous ribbon of clear glass of which both surfaces of the ribbon have a fire finish the undersurface may be given that finish by remelting the under-surface and then air chilling the melt as now described with reference to Figure 5.

In the construction shown in Figure 5 the series of plane supports 11 are interrupted to accommodate a heating chamber structure 19 which extends across the full width of the ribbon 16 and is supported on joists 20 carried on a suitable support indicated at 21. The heating chamber comprises a rear end wall 22 and a forward end wall 23 the disposition of the chamber being such that there is sufficient space between the wall and the undersurface of the ribbon to permit free passage of the ribbon over the heating chamber 19 in contiguity therewith, thereby a virtually closed heating chamber is provided opening to the undersurface of the ribbon.

The heating chamber structure comprises in addition to the end walls 22, 23 a floor 24 and two side walls 25, only one of which is shown thereby defining the chamber 19 within the structure. The structure is provided with wide slots 26 to accommodate burners, the construction of which is hereafter described by particular reference to Figure 6 which burners each produce a sheet of flame which sweeps the whole undersurface of the ribbon, in the direction of the moving ribbon. An outlet for the burnt gases is indicated at 27 and the general flow of the flame is indicated by the arrows 28 from which it will be appreciated that the flame from each of the burners arranged on the two slots 26 moves in substantial parallelism with the ribbon, the flame from each burner being in nature a sheet of flame which progressively sweeps the surface of the moving ribbon as it passes through the heating chamber 19. Thereby the undersurface of the ribbon can be remelted by the heat produced from the sweeping sheet of flame imparting heat at least in compensation for the loss of heat suffered by the molten metal 9 in passing over the casting roll 7. The side walls of the chamber may rise beyond the sides of the ribbon.

In order to maintain the ribbon on its predetermined horizontal path during its passage over the heating chamber there is disposed above the ribbon a suction plate 29 forming the floor of a suction chamber 30 comprised within a roof element 31 having a peripheral flange 32 which internally engages the suction plate 29 and is secured thereto by fixing elements, not shown.

The roof element 31 is apertured as indicated at 33, and a manifold 34 with branches 35 is connected to the suction chamber 30, the manifold being connected to an exhaust fan or pump for maintaining the desired degree of vacuum on the suction chamber 30, which is such as to hold the ribbon to the suction plate 29 and yet permit passage of the ribbon across the plate as it advances towards the annealing lehr.

The suction plate 29 may be formed of porous material e. g. formed of a suitable sintered material e. g. sintered stainless steel or ceramic material or the plate 29 may be apertured to the extent desired to provide the requisite suction area on the ribbon 16 to hold the latter in moving contact with the plate 29.

Disposed ahead of the heating chamber is means, generally indicated at 36 for producing a chilling effect on the undersurface of the ribbon 16 immediately after it leaves the heating chamber 19.

In the construction illustrated, the chilling means 36 is constituted by a trough-shaped funnel 37 provided with a supply pipe 38 through which air of the desired temperature is supplied, and the mouth of the funnel 37 is provided with an apertured plate 39 through which streams of air emerge as indicated by the arrows 40. Thus the remelted undersurface of the ribbon 16 is permitted to set solely by loss of heat by radiation and by heat exchange with the air, so that a fire finish is achieved and so that sufficient hardness is given to the surface before the advancing ribbon reaches the forward supports 11 which carry the ribbon as it moves forward.

The length of the plate 39 will correspond to the distance between the chamber 19 operating on the undersurface of the ribbon 16 and the supporting member 11 next ahead of the chilling means 36 and the width thereof will correspond to the width of the ribbon.

A plurality of chilling means may be employed where the distance between the heating chamber 19, and the supports 11 ahead thereof are spaced apart at such a distance as to make uneconomical the employment of one funnel 37, and to regulate the rate of chilling, valves may be provided in the supply lines such as 38 so as to avoid too sudden a chilling of the remelted undersurface.

In the apparatus described the suction plate 29 includes an extension disposed forwardly of the heating chamber 19 so that the ribbon immediately beyond the chamber 19 is maintained in the prescribed horizontal path by the suction applied through the extension overlying the chilling means 36.

From the foregoing it will be understood that the undersurface of the ribbon is subjected to the air streams 40 which effect a heat exchange assuring the reproduction of the required fire finish on the undersurface of the ribbon, and prevent injury to the fire finished surface produced by the heating chamber 19, when moving over the supporting members 11 ahead of the chilling means.

However the supporting member 11 next ahead of the chilling means 36 may be constituted by a porous plate, as for example, a plate formed from a suitable graphite compound, or a plate with apertures as indicated at 41, and a chamber 42 provided with an inlet 43 through which a gaseous medium, for example air, is supplied under pressure, in order to achieve the formation of a frictionless gaseous film between the ribbon 16 and the support. Thus a cushion of air is provided between the ribbon and the apertured supporting plate 41, which cushion assists in preventing any damage to the fire finished undersurface of the ribbon 16 during its advance. One more of the following supporting plates 11 may be similarly constructed.

Each slot 26 in the walls 22 and 24 of the heating chamber 19 extends substantially across the full width of the chamber, and a burner, which is of rectangular form, is fitted into each slot. As clearly shown in Figure 6 each burner is constituted by two similar iron sections 44 which are recessed on each of the opposed faces so as to form a slot 45 extending for the full width of the burner. The gas for combustion, with which air is admixed as desired, is supplied from a main 46, through branches 47 into a head space 48 in the burner, which head space houses a wire gauze 49. The gas, is then forced through the slot 45, to the mouth of the burner and the flame follows the paths 28 indicated in Figure 5.

The width of the heating chamber 19 is such that when the burners are accommodated therein the slot 45 of each burner extends across the full width of the ribbon 16.

The two halves 44 of the burner are bolted together, and the head space is covered by a plate 50 which is secured to each half of the burner by studs indicated at 51, and each branch 47 is fitted into a plate 50.

As indicated in Figure 6 the two halves 44 of the burner may be drilled as indicated at 52 to connect with bores 53 which form part of a closed circuit through which cooling water may be circulated. The supply line to, and the discharge line from, the bores 53 are omitted from the drawing for the sake of clarity.

In Figure 5 the rollers indicated at 54 perform part of the usual system of supporting rollers which carry the ribbon and cause the ribbon to advance in the predetermined horizontal plane into the annealing lehr, not shown, usually associated with continuous ribbon forming apparatus.

By the present invention a ribbon of glass, whether clear or opaque (in particular that opaque type of slow setting glass marketed under the trademark "Vitrolite") can be obtained the upper surface of which, being produced by natural flow of the molten glass is exceptionally flat, and since the upper surface sets, due to loss of heat by radiation and heat exchange with a gaseoum medium, a brilliant appearance is obtained; further by the process of remelting the undersurface of a quick setting glass ribbon a brilliant surface is obtained so that the ribbon of clear glass produced is one in which both surfaces have a fire finish.

Moreover, in view of the absence of an upper casting roll, maintenance costs are very considerably reduced, not only as regards the maintenance of the casting rolls but also as regards the maintenance of an efficient roll cooling system, which involves the pumping of an immense number of gallons per roll per day of twenty four hours, in actual practice the volume of water employed per roll is about 120,000 gallons.

We claim:

1. Apparatus for casting a continuous ribbon of glass comprising a spout leading from a glass melting tank furnace, said spout having a floor of a width substantially equal to the width of the ribbon to be produced, and cambered in a manner to compensate for variations in the viscosity of the glass across said floor, a casting roll disposed immediately under the pouring end of the spout so that glass leaving the spout flows forwardly on to the roll and then downwardly in ribbon form on the roll and a pair of coaxial rollers juxtaposed to the casting roll to engage and compress only the marginal portions of the ribbon on the roll, means for driving the casting roll and means for synchronously driving the rollers so that the driven rollers advance the ribbon as it is formed.

2. Apparatus for casting a continuous ribbon of glass according to claim 1, wherein the cambered floor of the spout comprises a middle area which is inclined upwardly from the horizontal towards the pouring end of the spout and the side areas of the floor are inclined downwardly from the horizontal towards the pouring end of the spout, whereby a ribbon of substantially constant thickness is poured from the spout on to the casting roll.

3. Apparatus for casting a continuous ribbon of glass as described in claim 1, including means for heating the underside of the ribbon which has passed in contact with the casting roll sufficiently to remelt the surface of the underside of the ribbon, and means for continuously advancing the ribbon with the remelted surface through a zone in which the remelted surface is caused to set solely by radiation and by the cooling action of a gaseous medium to obtain a fire finish on said under surface.

4. An apparatus for manufacturing flat glass in continuous ribbon form, comprising a spout of a glass melting tank furnace, said spout having a width substantially equal to that of the glass ribbon to be formed, the floor of said spout being cambered, so that the slope of the floor in the longitudinal direction of flow increases progressively from the sides of the floor towards the middle of the floor to compensate for variations in the viscosity of the glass across said floor, whereby the ribbon of molten glass discharged from said spout has a cross-section of substantially constant thickness crosswise of the spout, a casting roll disposed near the discharge end of said spout to receive directly therefrom the glass in ribbon form, while maintaining said constant thickness on said casting roll, except for any design pattern which may be cast in said glass by said casting roll, and means for drawing forward glass from the sides of the spout and advancing the resulting ribbon over said casting roll and forwardly thereof, including a pair of coaxial feed rollers juxtaposed to the casting roll for feed cooperation therewith and adapted to engage only the side marginal portions of the glass formed on said casting roll.

References Cited in the file of this patent

UNITED STATES PATENTS

| | | |
|---|---|---|
| 972,166 | De Bay | Oct. 11, 1910 |
| 1,586,187 | Ferngren | May 25, 1926 |
| 1,605,736 | Howard | Nov. 2, 1926 |
| 1,761,204 | Fraser | June 3, 1930 |
| 1,818,207 | Drake | Aug. 11, 1931 |
| 2,167,290 | Boudin | July 25, 1939 |
| 2,487,355 | McNamara et al. | Nov. 8, 1949 |

U. S. DEPARTMENT OF COMMERCE
PATENT OFFICE
CERTIFICATE OF CORRECTION

Patent No. 2,826,868                      March 18, 1958

Hubert Cecil Wynne et al.

It is hereby certified that error appears in the printed specification of the above numbered patent requiring correction and that the said Letters Patent should read as corrected below.

Column 6, line 15, for "reproduction" read -- production --.

Signed and sealed this 22nd day of April 1958.

(SEAL)
Attest:

KARL H. AXLINE
Attesting Officer

ROBERT C. WATSON
Commissioner of Patents